(12) United States Patent
Mastie et al.

(10) Patent No.: US 6,992,790 B2
(45) Date of Patent: Jan. 31, 2006

(54) METHOD AND APPARATUS FOR IMPROVING PAGE DESCRIPTION LANGUAGE (PDL) EFFICIENCY BY RECOGNITION AND REMOVAL OF REDUNDANT CONSTRUCTS

(75) Inventors: Scott David Mastie, Longmont, CO (US); Christopher Brian Hirsch, Arvada, CO (US); Arthur Ray Roberts, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/402,445

(22) Filed: Mar. 28, 2003

(65) Prior Publication Data

US 2003/0184804 A1 Oct. 2, 2003

Related U.S. Application Data

(63) Continuation of application No. 09/107,543, filed on Jun. 30, 1998, now Pat. No. 6,583,890.

(51) Int. Cl.
*G06K 15/00* (2006.01)

(52) U.S. Cl. ............... 358/1.18; 358/1.11; 358/1.9; 715/500

(58) Field of Classification Search .......... 358/1.1–1.9, 358/1.11–1.18; 715/500; 707/100, 200
See application file for complete search history.

(56) References Cited

U.S. PATENT DOCUMENTS

5,963,968 A * 10/1999 Warmus et al. .............. 715/517
6,064,397 A * 5/2000 Herregods et al. .......... 345/630

* cited by examiner

*Primary Examiner*—King Y. Poon
(74) *Attorney, Agent, or Firm*—David W. Victor; Konrad Raynes & Victor LLP

(57) ABSTRACT

A method and system for removing redundant or repeated information from a multiple-page document file is described. A master prolog is created for storing information which is repeated in two or more pages within the document file. Repeated information that is stored in both the master prolog and one or more pages within the document file are identified. The repeated information is then removed from one or more of the pages within the document file. The master prolog is implemented within one or more of the pages to provide a more efficient representation of the repeated information.

39 Claims, 5 Drawing Sheets

METHOD AND APPARATUS FOR IMPROVING PAGE DESCRIPTION LANGUAGE (PDL) EFFICIENCY BY RECOGNITION AND REMOVAL OF REDUNDANT CONSTRUCTS

CROSS-REFERENCE TO RELATED COPENDING PATENT APPLICATIONS

This application is a continuation of application Ser. No. 09/107,543, titled "SYSTEM AND APPARATUS FOR IMPROVING PAGE DESCRIPTION LANGUAGE (PDL) EFFICIENCY BY RECOGNITION AND REMOVAL OF REDUNDANT CONSTRUCTS," by S. D. Mastie, et al., filed on Jun. 30, 1998, U.S. Pat. No. 6,583,890 and which is incorporated herein by reference in its entirety.

The following patent applications which are assigned to the assignee of the present invention cover subject matter related to the subject matter of the present invention: "Method and Apparatus to Facilitate Creation of Documents from Individual Pages", Ser. No. 09/109,990 and "Method and Apparatus of Creating Highly Portable Output Files", Serial No. 09/107,333; all are assigned to International Business Machines Corporation by Scott Mastie, et al. and all are filed concurrently herewith.

BACKGROUND OF THE INVENTION

1. Field of the Invention

The present invention relates to a system and method for processing page description language (PDL) files, and more specifically, for removing redundant information from a PDL file.

2. Description of Related Art

Printing refers to the reproduction of words and pictures on a page or document. Today, the high volume production machines of the major printing processes are the presses, which use plates (or other types of image carriers) to transfer the ink onto the paper or substrate. These processes are often used to support markets such as commercial printing, magazines, newspapers, catalogs, books, business forms, greeting cards, maps, labels, packaging, and other printed products.

One common type of production printing process is the offset printing process which uses an intermediate blanket cylinder to transfer an image from the image carrier to the substrate. The offset printing process, and in particular its prepress operations, involve intricate manual operations which are very time consuming and cost intensive, and require highly skilled expensive professionals.

With the development of digital image processing, digital printing systems may be used to improve the productivity, quality, and efficiency of many printing operations. Many digital printing systems use a plateless printing process. Common plateless digital printing processes include electrophotography, ink-jet, and thermal transfer, etc. Digital printing systems are often desirable over printing press processes because (1) most of the equipment are suitable for an office environment (2) its capabilities of variable printing from impression-to-impression; and (3) requires less manual skills than printing on conventional plate presses.

As the printing industry transitions from conventional printing press operations to digital printing operations to take advantage of the technological advances made in digital imaging, it is possible to provide a more automated printing process. One approach to providing a more automated digital printing process is to store, back-up, recover, and print a multiple-page document as a single file, particularly when the multiple-page document has several hundreds or thousands of pages.

The multiple-page document file is typically written in a page description language (PDL) or some other programming language that can be recognized by an output device or processing device. PDL generally refers to a computer language designed for describing how type and graphic elements should be produced by an output device (e.g., a printer). PostScript®, developed by Adobe Systems, Inc., is a widely adopted PDL that can be used to specify the contents of a page that is to be printed. PostScript is a registered trademark of Adobe Systems, Inc. Each PostScript file is a purely text-based description of a page which uses the ASCII character set and which can be generated on every widely used operating system. The biggest advantage of PostScript is device independence. Graphics are defined not according to the characteristics of a particular device (i.e., page size, color depth, resolution, etc.) but independently. In other words, it is possible to output a PostScript file with more or less identical results on various machines—the only visible difference is the increasing reproduction quality as the resolution increases. Virtually every application program running in every desktop computer outputs PostScript and virtually every printer of every type accept PostScript-coded files.

It has been observed that PDL or PostScript files, particularly large files, often contain redundant information. For example, PostScript pages often have 20% of its source represent page content and 80% of its source represent prolog material located at the beginning of the file to prepare the page environment (e.g., macros). Often, the same macros and other information in the prolog are repeated in the prolog of one or more PostScript pages within a multiple-page document. By repeating the same macros and material in multiple page prologs, the multiple-page document file consumes considerably more storage space than if the redundant information was consolidated in a more efficient manner. Furthermore, repeating the same information in multiple page prologs may not print a PDL or PostScript file in a highly efficient manner.

SUMMARY OF THE INVENTION

It is an object of the present invention to provide a more efficient page description language (PDL) file by removing redundant information in the PDL file.

It is also an object of the present invention to provide a PDL file having reduced size when such redundant information is removed from the PDL file.

Additionally, it is an object of the present invention to provide a PDL file that will print faster when such redundant information is removed from the PDL file.

A method and system for removing redundant or repeated information from a multiple-page document file is described. A master prolog is created for storing information which is repeated in two or more pages within the document file. Repeated information that is stored in both the master prolog and one or more pages within the document file are identified. The repeated information is then removed from one or more of the pages within the document file. The master prolog is implemented within one or more of the pages to provide a more efficient representation of the repeated information.

One aspect of the present invention describes a master prolog in the form of a dictionary.

Another aspect of the present invention describes creating the master prolog either off-line by observation or on-line in real time while identifying redundant information across multiple-pages.

A further aspect of the present invention is measuring the performance and/or size of the document file and restoring the original document file (i.e., without the master prolog) if predetermined threshold values are not satisfied.

An additional aspect of the present invention is adding an instruction to one or more pages to reference the master prolog.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention describes a method and apparatus to remove redundant material from a page description language (PDL) file. The PDL file may be a PostScript file. For one embodiment of the present invention, the PDL file represents a multiple-page document file that was created by assembling a collection of page files. For one embodiment of the present invention, the multiple-page document file represents a total of "M" pages and each of the page files represent one page or a grouping of "n" pages, where 1<n<M. Generally, each of the page files include a page prolog that defines the variables, fonts, macros, etc. that are used by the body of the page to create the page data.

It has been found that very similar or identical information (e.g., constructs) is often repeated across the prologs in one or more pages within a document file. Under certain circumstances, by replacing such redundant material with a more efficient representation, the size of the document file can be reduced (e.g., by 80%) and the time to rasterize the document file decreases such that the multiple-page document file is printed more efficiently. The time to rasterize generally refers to the amount of time it takes the raster image processor (RIP) to convert vector graphics or text into a raster (bitmapped) image.

Figure 1:
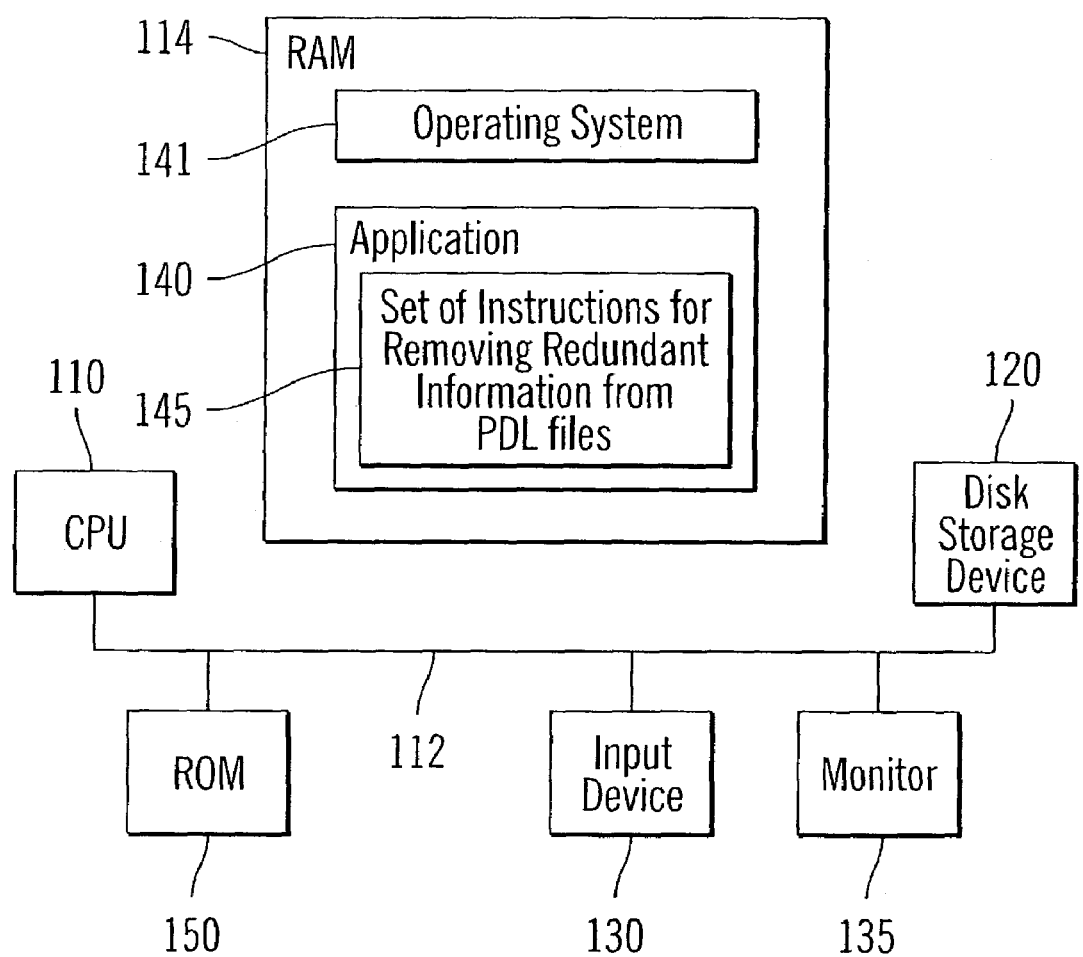
FIG. 1 illustrates a computer system in accordance with one embodiment of the present invention.

FIG. 1 illustrates a data processing system 100 for removing redundant information from PDL files in accordance with one embodiment of the present invention. It is within the scope of the present invention for data processing system 100 to consist of a workstation, server, personal computer system, set top box, or any other device that may remove redundant information from PDL files.

A central processing unit (CPU) 110, such as one of the PC microprocessors available from International Business Machines Corp., is provided for processing data and executing instructions. The CPU 110 is interconnected to various other components by a system bus 112.

An operating system 141 runs on CPU 110, provides control and is used to coordinate the function of the various components shown in FIG. 1. Operating system 141 may be one of the commercially available operating systems. An application program 140, which includes a set of instructions 142 for removing redundant information from PDL files (to be subsequently described in detail), runs in conjunction with operation system 141 which implements the various functions to be performed by application program 140.

Also shown in FIG. 1, application program 140 includes a set of instructions 145 for removing redundant information from PDL files, according to one embodiment of the present invention, as is described in more detail below. In alternative embodiments, the set of instructions for removing redundant information from PDL files could be stored in memory exclusive of application program 140, or alternatively, could be implemented in hardware circuitry or firmware (e.g., read-only-memory).

Random access memory (RAM) 114 is coupled to system bus 112. The software components (e.g., operating system 141 and application 140) are loaded into RAM 114, which operates as the data processing system's main memory.

Also coupled to system bus 112 is an input device 130 for entering data into system 100, a monitor 135 for displaying data, a disk storage device 120 for storing data and instructions, and a read only memory (ROM) 150 for controlling the basic computer functions (e.g., basic input/output system (BIOS)).

Figure 2:
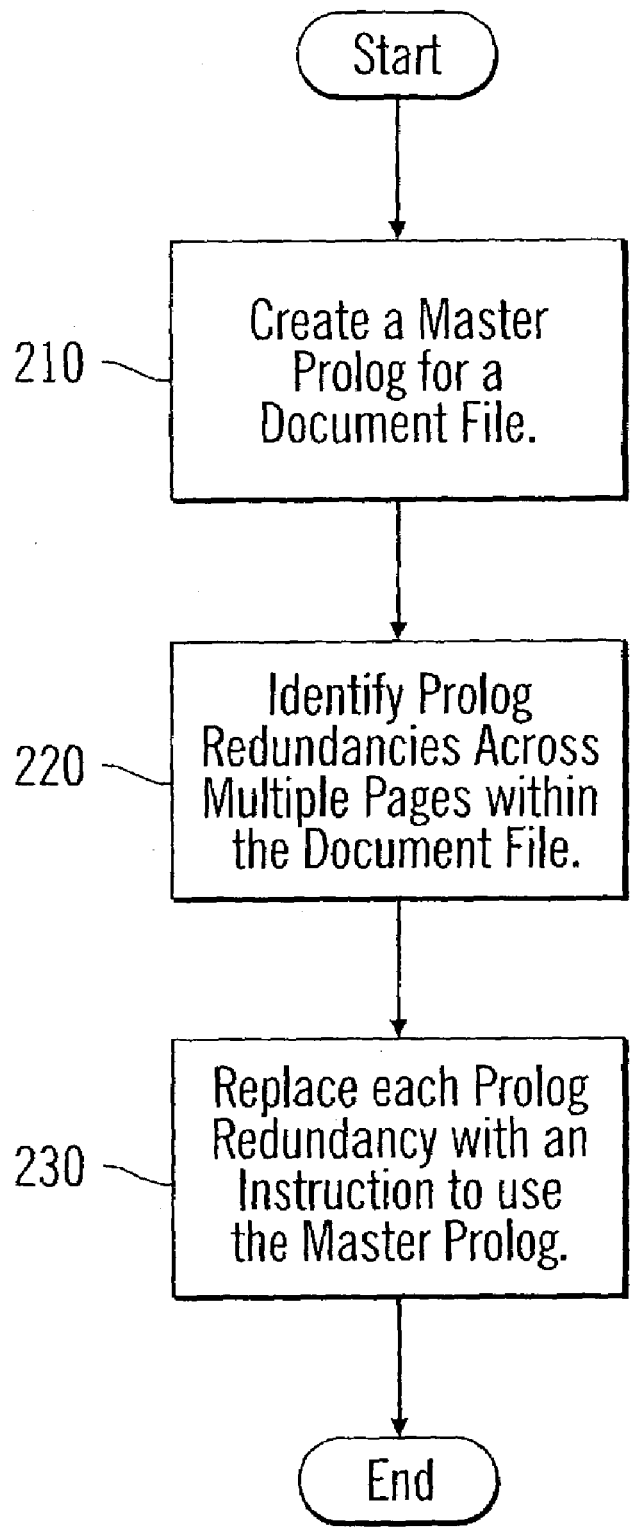
FIG. 2 illustrates a flow chart describing the steps of identifying and removing redundant material from a PDL document file by using a Master Prolog in accordance with one embodiment of the present invention.

FIG. 2 illustrates a method of identifying and removing redundant material from a document file in accordance with one embodiment of the present invention. For one embodiment of the present invention, the document file is a page description language file (PDL). For alternative embodiments the document file is not written in a page description language but some other type of programming language. According to FIG. 2, the first step 210 is to create a Master Prolog for the document file. A prolog, which is short for "programming in logic", generally refers to a compiled language that works with the logical relationship between pieces of data rather than mathematical relationships. A PDL prolog defines the variables, fonts, macros, etc. that are used by the body of the page to create the page data. Generally, each of the pages (or group of pages) in the document file has a page prolog. It is often common to have identical information in one or more page prologs. The Master Prolog, which is a superset of one or more page prologs within a document, is created to provide a more efficient way of printing a PDL file having redundant material (e.g., constructs).

For one embodiment of the present invention the Master Prolog can be created off-line using an observation method (i.e., looking at all the page prologs in the document file, or a sample of the page prologs in the document file when the pages are generally uniform). For an alternative embodiment of the present invention, the Master Prolog can be created on-line in real time while assembling the collection of individual page files into a multiple-page document file.

Constructs are then added to the document file, generally at the header, to define the Master Prolog at the document level.

Once the Master Prolog is created in the document file, then the next step is to identify the prolog redundancies across the pages within the document file, as shown in step 220. Redundant material can be identified by finding redundant text in one or more page prologs within the document file.

Then in step 230, the redundant material in the page prologs is replaced with an instruction to use the information stored in the Master Prolog. Alternatively, some other means for referencing the Master Prolog may be implemented. In other words, rather than defining the variables, font, macro, etc. at the page prolog level, each redundant piece of information is defined once in the Master Prolog and then the Master Prolog is referenced when these definitions are required. Thus, the Master Prolog provides a more efficient means to represent redundant or repeated information. By removing such redundant material from the page prologs and replacing it with an instruction to use the Master Prolog, the size of the document file is often reduced and the document file can be more efficiently printed.

Figure 3:
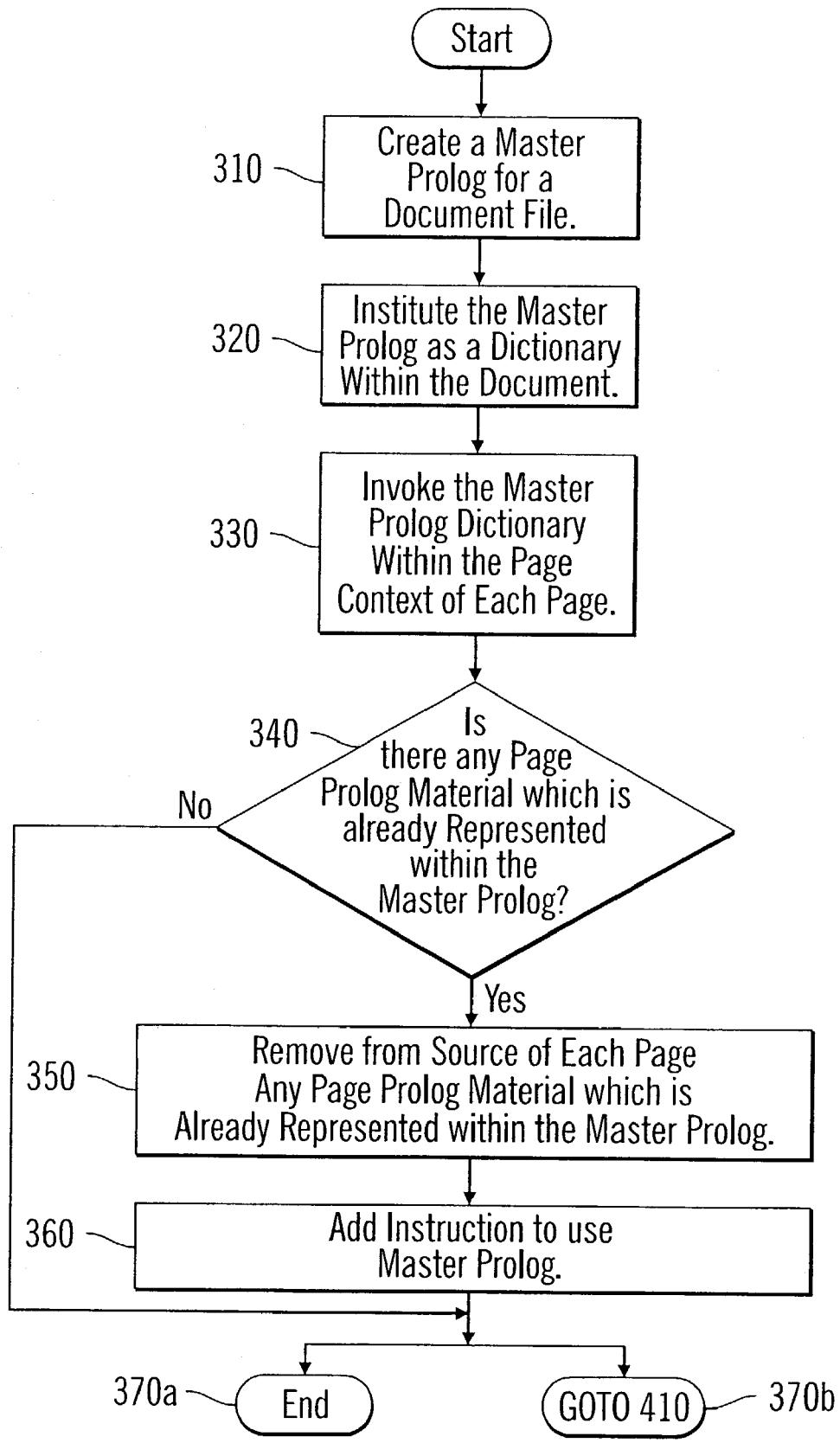
FIGS. 3 and 4 illustrate a flow chart describing the steps of identifying and removing redundant material from a PostScript document file by using a Master Prolog in the form of a dictionary in accordance with another embodiment of the present invention.

FIG. 3 illustrates an alternative method of identifying and removing redundant material from a document file. The first step 301 is to create a Master Prolog using either an off-line method or on-line method as described above in accordance with step 210.

Constructs are then added to the document file to define the Master Prolog at the document level. For one embodiment of the present invention, the Master Prolog may be instituted in the form of a dictionary, which includes a list of all the identified redundant material, as shown in step 320. In other words, the dictionary includes a composite list of all redundant information identified in the document file. For one embodiment of the present invention, the dictionary is placed at the beginning of the document file. For alternative embodiments, the dictionary may be place at some other location within the document file.

Next, in step 330, the Master Prolog, which may be defined at the beginning (or some other location) of the document file in the form of a dictionary, is brought into the page environment. This can be accomplished by determining whether there is any page prolog material which is already represented within the Master Prolog, as shown in step 340. If there is redundant material (i.e., there is page prolog material which is already represented within the Master Prolog), then the method performs step 350 next, otherwise, the method proceeds to step 370*a* or 370*b*.

While performing step 350, all material within the page prologs which is already represented in the Master Prolog is removed from the page prologs. Additionally, in step 360, an instruction, comment, or some other means is added to the page prolog to reference the Master Prolog to get the appropriate information. For one embodiment of the present invention, the redundant material at the page prolog level is replaced with an instruction to use the Master Prolog, which includes the redundant information, generally listed once, in its dictionary. Thus, such redundant information is no longer redundant because it is listed (or defined) only once in the document file, although it is accessed and used multiple times.

Figure 4:
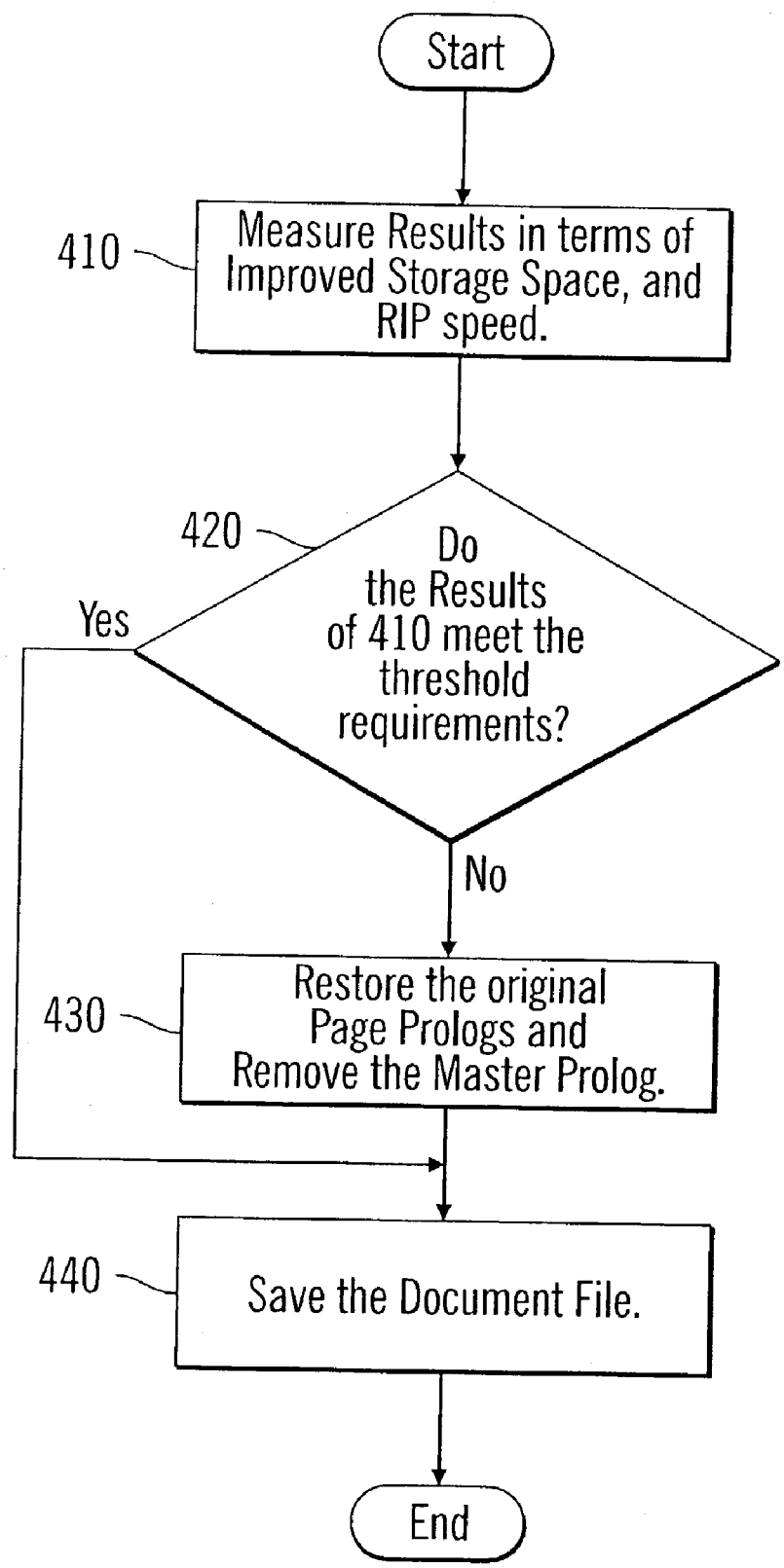

For one embodiment of the present invention, the method of identifying and removing redundant material from a document file may also be extended to include the method shown in FIG. 4.

In step 410, the efficiency of the modified document file is measured in terms of rasterizing speed and file size. In step 410, a determination is made whether or not the results meet the threshold requirements for a particular output file (e.g., printing of the document file is too slow or the file size is too large). If the threshold requirements are not met, then the original document file is restored, as shown in step 430. That is, the original page prologs are restored and the Master Prolog is removed. Then in step 440, the document file is saved as the output file. On the other hand, if the threshold requirements are met, then the document file, which includes the Master Prolog, is saved as the output file.

The method of identifying and removing redundant material from a document file may be performed while assembling a collection of files into a multiple-page document file while creating a digital book or document having multiple pages. Note that for alternative embodiments, the method of identifying and removing redundant material from a document file may be performed before or after the document file has been assembled. Alternatively, the method of identifying and removing redundant material from the document file may be performed independent from any type of assembly process.

Figure 5:
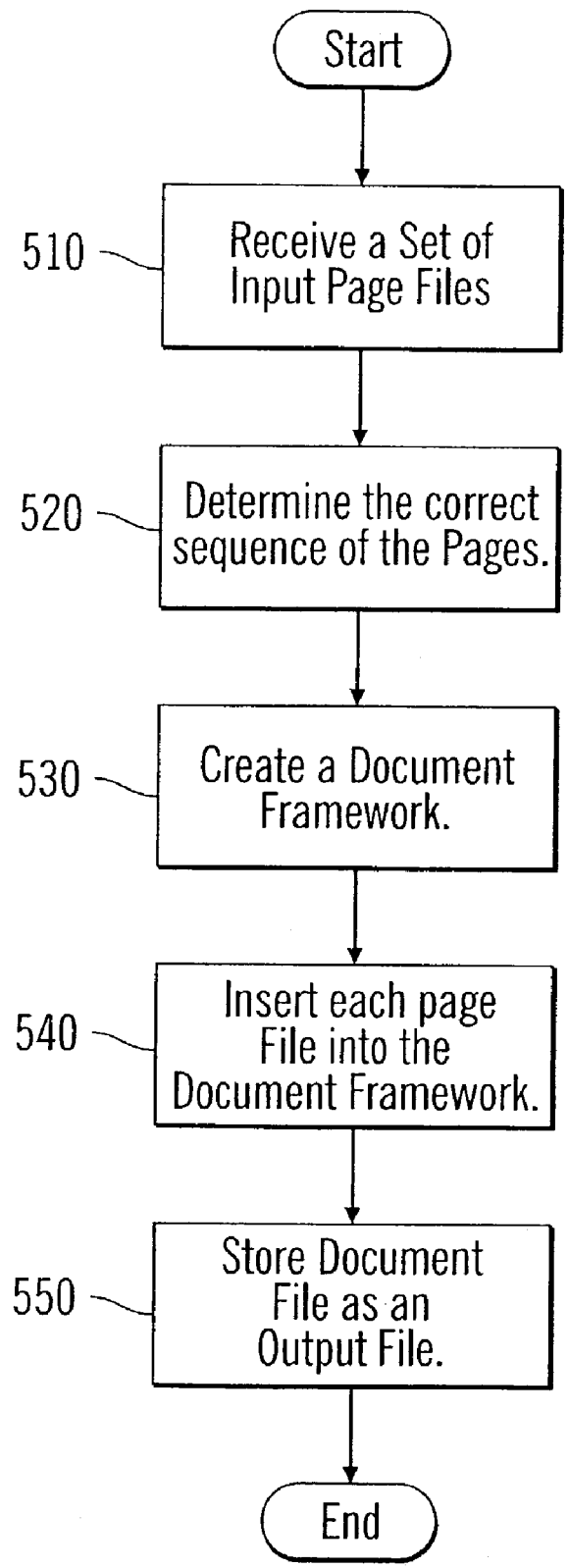
FIG. 5 illustrates a flow chart describing the steps of identifying and removing redundant material from a PDF file while assembling a multiple-page document file from a collection of document files in accordance with one embodiment of the present invention.

FIG. 5 illustrates a method of assembling a document file from a collection of page files. For one embodiment of the present invention, the multiple-page document file represents a total of "M" pages and each of the page files represent a one page or a grouping of "n" pages, where 1<n<M.

FIG. 5 illustrates a flowchart for assembling a set of page files into a document file. For one embodiment of the present invention, the set of page files are written in a PDL. In general, a PDL refers to a computer language that is designed for describing how type and graphic elements should be produced by output devices such as printers. For one embodiment of the present invention, the document file represents a digital book, catalog, pamphlet, magazine, or any other publication having multiple pages that need to be combined.

According to FIG. 5, the method of assembling a set of page files into a single multiple-page document starts with receiving a set of input pages to be assembled as shown in step 510. For one embodiment of the present invention, the set of page files represent a set of PostScript files.

Once the set of files is received, the next step 520 is to determine the correct sequence of the pages within the multiple-page document file. The correct sequence of pages can be determined by various methods. For example, the correct sequence can be determined by performing an alpha-numeric sort of the file names of the input pages; by checking the contents of each input page file; or by the explicit enumeration of input page files provided as additional input.

Next, a document framework for the document file, which is capable of holding all or a portion of the pages within the set of page files, is created in step 530. For example, if the document provided by this method is to be a single PostScript file, then the document framework is defined by the PostScript programming language. For one embodiment of the present invention, step 530 may also include step 210 for creating a Master Prolog for the document file, as described above.

In step 540, each input page is inserted into the document framework. Step 540 may require adding page constructs and removing document constructs. Note that each input page file typically represents one page or a group of "n" pages and there pages often need to be modified to fit into a document framework. For one embodiment of the present invention, step 540 may include step 220 for identifying prolog redundancies across the multiple page files and step 230 for replacing each prolog redundancy with an instruction to use the Master Prolog, described above. Step 540 may also include the option of inserting blank pages into the document framework.

Once all the pages have been merged or inserted into the document framework, the document file which represents the digital book, is stored as an output file. For one embodiment of the present invention, the output file is a PostScript file. The output file may be sent to a printer as a single job to be printed or stored on various types of removable storage media such as a cd-rom or floppy disk, etc. which allows the output file to be retrieved for use at a later time.

One advantage of storing the entire digital book as a single multiple-page document file is that entire books or publications may be printed on demand (as a single job) without the need to handle multiple print files (or jobs). The reproduction of a multiple-page document using multiple print jobs often require manual collating or assembling. Furthermore, offset printing processes require additional manual operations to prepare the press plates. The present invention may be used to provide a cost effective solution for low volume reproductions of books and other publications, in addition to reducing the size of the print file and increasing the printing speed.

The present invention of removing redundant information from PDL or other files may be provided as a computer program product which may include a machine readable medium having stored thereon instructions which can be used to program a computer (or other electronic devices) to perform a process according to the present invention. The machine readable medium may include, but is not limited to, floppy disks, optical disks, cd-roms, magneto-optical disks, ROMs, RAMs, EPROMs, EEPROMs, magnetic or optical cards, or any type of media/machine readable medium suitable for storing electronic instructions.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer implemented method of processing a multiple-page file including pages having page information used to control how the page data is generated, comprising:
   generating a master data structure indicating page information repeated in multiple pages;
   identifying instances of repeated page information repeated in the pages of the multi-page file; and
   replacing identified instances of the repeated page information in the pages with references to the repeated page information indicated in the master data structure.

2. The method of claim 1, wherein the page information comprises at least cue of variables, fonts, and macros.

3. The method of claim 1, wherein the master data structure comprises a master prolog and wherein the identified instances of repeated page information are included in a prolog section of the pages defining page information used to create the page data.

4. The method of claim 3, wherein each page in the multi-page file has a prolog section capable of having references to page information in the master data structure.

5. The method of claim 1, wherein the master data structure is included in the multi-page file.

6. The method of claim 5, wherein the master data structure comprises a dictionary including a list of all identified repeated page information in the pages, and wherein the master data structure is located at the beginning of the multi-page file.

7. The method of claim 5, wherein the redundant page information is defined once in the waster data structure and referenced multiple times in the pages.

8. The method of claim 1, wherein generating the master data structure comprises:
   displaying repeated page information from the pages to enable a user to identify instances of page information repeated in the multi-page file; and
   receiving user input indicating repeated page information in the pages to include in the master data structure.

9. The method of claim 1, wherein generating the master data structure comprises:
   processing the pages in the multi-page document to determine instances of page information repeated in the pages; and
   indicating determined repeated information in the master data structure.

10. The method of claim 1, wherein the operations of identifying the repeated page information and replacing the instances of the repeated page information are performed after generating the master data structure including the repeated page information.

11. The method of claim 1, wherein the operations of identifying the instances of repeated page information in the pages and replacing the instances of repeated page information are performed while assembling the pages into the multi-page file.

12. The method of claim 1, wherein the references comprise instructions to use page information defined in the master data structure.

13. The method of claim 1, wherein the multi-page file including the master data structure and references to page information in the master data structure comprises a PostScript file capable of being sent to a printer as a single job to be printed.

14. A system, comprising:
   a processor;
   a computer readable medium;
   a multiple-page file including pages having page information used to control how the page data is generated; and
   a program included in the computer readable medium enabled to cause the processor to perform:
      (i) generating a master data structure indicating page information repeated in the pages;
      (ii) identifying instances of repeated page information repeated in the pages of the multi-page file; and
      (iii) replacing identified instances of the repeated page information in the pages with references to the repeated page information indicated in the master data structure.

15. The system of claim 14, wherein the page information comprises at least one of variables, fonts, and macros.

16. The system of claim 14, wherein the master data structure comprises a master prolog and wherein the identified instances of repeated page information are included in a prolog section of the pages defining page information used to create the page data.

17. The system of claim 16, wherein each page in the multi-page file has a prolog section capable of having references to page information in the master data structure.

18. The system of claim 14, wherein the master data structure is included in the multi-page file.

19. The system of claim 18, wherein the master data structure comprises a dictionary including a list of all identified repeated page information in the pages, and wherein the master data structure is located at the beginning of the multi-page file.

20. The system of claim 18, wherein the redundant page information is defined once in the master data structure and referenced multiple times in the pages.

21. The system of claim 14, wherein generating the master data structure comprises:
  displaying repeated page information from the pages to enable a user to identify instances of page information repeated in the multi-page file; and
  receiving user input indicating repeated page information in the pages to include in the master data structure.

22. The system of claim 14, wherein generating the master data structure comprises:
  processing the pages in the multi-page document to determine instances of page information repeated in the pages; and
  indicating determined repeated information in the master data structure.

23. The system of claim 14, wherein the operations of identifying the repeated page information and replacing the instances of repeated page information are performed after generating the master data structure including the repeated page information.

24. The system of claim 14, wherein the operations of identifying the instances of repeated page information in the pages and replacing the instances of repeated page information commands are performed while assembling the pages into the multi-page file.

25. The system of claim 14, wherein the reference comprises an instruction to use page information defined in the master data structure.

26. The system of claim 14, wherein the multi-page file including the master data structure and references to page information in the master data structure comprises a PostScript file capable of being sent to a printer as a single job to be printed.

27. A machine-readable medium having stored thereon data representing instructions for processing a multiple-page including pages having page information used to control how the page data is generated, wherein the instructions when executed by a processor cause the processor to perform:
  generating a master data structure indicating page information repeated in the pages;
  identifying instances of repeated page information repeated in the pages of the multi-page file; and
  replacing identified instances of the repeated page information in the pages with references to the repeated page information indicated in the master data structure.

28. The machine readable medium of claim 27, wherein the page information comprises at least one of variables, fonts, and macros.

29. The machine readable medium of claim 27, wherein the master data structure comprises a master prolog and wherein the identified instances of repeated page information are included in a prolog section of the pages defining page information used to create the page data.

30. The machine readable medium of claim 29, wherein each page in the multi-page file has a prolog section capable of having references to page information in the master data structure.

31. The machine readable medium of claim 27, wherein the master data structure is included in the multi-page file.

32. The machine readable medium of claim 31, wherein the master data structure comprises a dictionary including a list of all identified repeated page information in the pages, and wherein the master data structure is located at the beginning of the multi-page file.

33. The machine readable medium of claim 31, wherein the redundant page information is defined once in the master data structure and referenced multiple times in the pages.

34. The machine readable medium of claim 27, wherein generating the master data structure comprises:
  displaying repeated page information from the pages to enable a user to identify instances of page information repeated in the multi-page file; and
  receiving user input indicating repeated page information in the pages to include in the master data structure.

35. The machine readable medium of claim 27, wherein generating the master data structure comprises:
  processing the pages in the multi-page document to determine instances of page information repeated in the pages; and
  indicating determined repeated information in the master data structure.

36. The machine readable medium of claim 27, wherein the operations of identifying the repeated page information and replacing the instances of the repeated page information are performed after generating the master data structure including the repeated page information.

37. The machine readable medium of claim 27, wherein the operations of identifying the instances of repeated page information in the pages and replacing the instances of repeated page information commands are performed while assembling the pages into the multi-page file.

38. The machine readable medium of claim 27, wherein the reference comprises an instruction to use page information defined in the master data structure.

39. The machine readable medium of claim 27, wherein the multi-page file including the master data structure and references to page information in the master data structure comprises a PostScript file capable of being sent to a printer as a single job to be printed.

* * * * *